United States Patent
Zhu et al.

(10) Patent No.: US 10,255,388 B2
(45) Date of Patent: *Apr. 9, 2019

(54) METHOD FOR DESIGNING OFF-AXIAL OPTICAL SYSTEM WITH FREEFORM SURFACE

(71) Applicants: Tsinghua University, Beijing (CN); HON HAI PRECISION INDUSTRY CO., LTD., New Taipei (TW)

(72) Inventors: Jun Zhu, Beijing (CN); Tong Yang, Beijing (CN); Xiao-Fei Wu, Beijing (CN); Guo-Fan Jin, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 485 days.

This patent is subject to a terminal disclaimer.

(21) Appl. No.: 15/011,640

(22) Filed: Jan. 31, 2016

(65) Prior Publication Data

US 2016/0232257 A1 Aug. 11, 2016

(30) Foreign Application Priority Data

Feb. 5, 2015 (CN) .......................... 2015 1 0061859

(51) Int. Cl.
*G06F 17/50* (2006.01)
*G02B 17/06* (2006.01)
*G02B 27/00* (2006.01)

(52) U.S. Cl.
CPC ...... *G06F 17/5009* (2013.01); *G02B 17/0642* (2013.01); *G02B 17/0663* (2013.01); *G02B 27/0012* (2013.01)

(58) Field of Classification Search
CPC ............ G02B 17/0642; G02B 17/0663; G02B 27/0012; G06F 17/5009
See application file for complete search history.

(56) References Cited

U.S. PATENT DOCUMENTS

| | | | |
|---|---|---|---|
| 8,035,898 B2 * | 10/2011 | Minano | G02B 27/0012 359/642 |
| 2005/0086032 A1 * | 4/2005 | Benitez | G02B 27/0012 703/1 |

* cited by examiner

*Primary Examiner* — Kamini S Shah
*Assistant Examiner* — John E Johansen
(74) *Attorney, Agent, or Firm* — ScienBiziP, P.C.

(57) ABSTRACT

A method for designing off-axial optical system with freeform surfaces is provided. An initial system is established. A freeform surface of the off-axial optical system that needs to be solved is defined as a freeform surface. A number of feature rays are selected. A number of intersections of the feature rays with the freeform surface are calculated point by point based on a given object-image relationship and a vector form of Snell's law. A number of first feature data points are obtained from the intersections and surface fitted to obtain the freeform surface. All the freeform surfaces of the off-axial optical system that need to be solved are obtained by the method above to form a before-iteration off-axial optical system. The before-iteration off-axial optical system is used as the initial system for multiple iterations to obtain an after-iteration off-axial optical system.

11 Claims, 7 Drawing Sheets

METHOD FOR DESIGNING OFF-AXIAL OPTICAL SYSTEM WITH FREEFORM SURFACE

CROSS-REFERENCE TO RELAYED APPLICATIONS

This application claims all benefits accruing under 35 U.S.C. § 119 from China Patent Application No. 201510061859.8, field on Feb. 5, 2015 in the China Intellectual Property Office, disclosure of which is incorporated herein by reference.

BACKGROUND

1. Technical Field

The present disclosure relates to a method for designing off-axial optical system with freeform surface based on point-by-point construction and iteration process.

2. Description of Related Art

Compared with conventional rotationally symmetric surfaces, freeform optical surfaces have more degrees of freedom, which can reduce the aberrations and simplify the structure of the system in optical design. In recent years, with the development of the advancing manufacture technologies, freeform surfaces have been successfully used in the optical field, such as head-mounted-displays, reflective systems, varifocal panoramic optical systems, and microlens arrays.

However, in conventional direct design methods, the freeform surfaces are designed by a direct construction method, the image quality of the freeform surfaces is generally low, average RMS spot diameter is relative large, and further optimization will be much more difficult.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
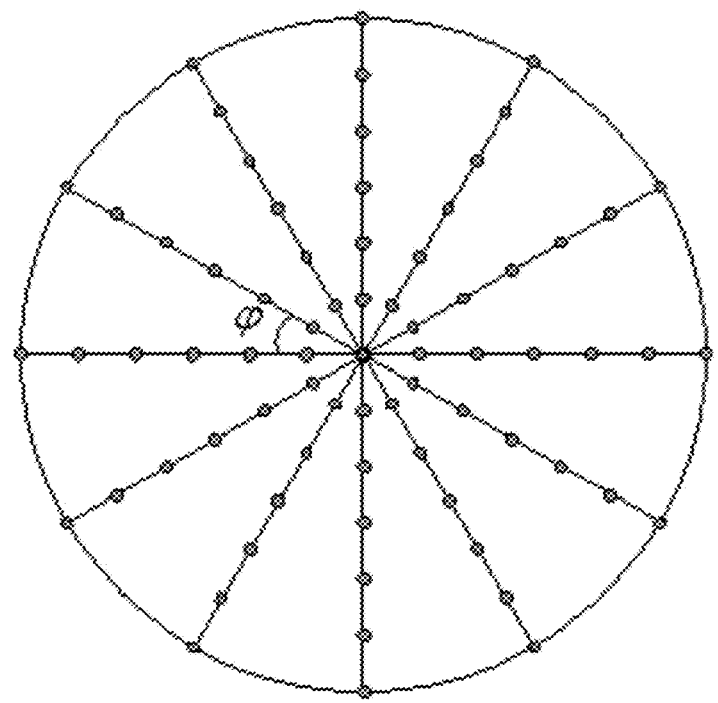
FIG. 1 is a schematic view of a selecting method of a plurality of feature rays employed in each field.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "comprising" means "including, but not necessarily limited to"; it specifically indicates open-ended inclusion or membership in a so-described combination, group, series, and the like. It should be noted that references to "one" embodiment in this disclosure are not necessarily to the same embodiment, and such references mean at least one.

A method for designing an off-axial optical system with freeform surface of one embodiment is provided. The method comprises the following steps:

step (S1), establishing an initial system, wherein the initial system comprises a plurality of initial surfaces, and each of the plurality of initial surfaces corresponds to one freeform surface of the off-axial optical system;

step (S2), one freeform surface of the off-axial optical system that need to be solved is defined as a first freeform surface "a", keeping the plurality of initial surfaces unchanged, selecting a plurality of feature rays $R_i$ (i=1, 2 ... K), calculating a plurality of intersections of the plurality of feature rays $R_i$ (i=1, 2 ... K) with the first freeform surface "a" point by point based on a given object-image relationship and a vector form of Snell's law, wherein the plurality of intersections are a plurality of first feature data points $P_i$ (i=1, 2 ... K) of the first freeform surface "a"; and obtaining the first freeform surface "a" by surface fitting the plurality of first feature data points $P_i$ (i=1, 2 ... K), wherein an equation of the first freeform surface "a" comprises a base conic term and a freeform surface term;

step (S3), another freeform surface of the off-axial optical system that need to be solved is defined as a second freeform surface "b", keeping the first freeform surface "a" and some of the plurality of initial surfaces that does not corresponds to the first freeform surface "a" unchanged, calculating a plurality of intersections of the plurality of feature rays $R_i$ (i=1, 2 ... K) with the second freeform surface "b" point by point based on a given object-image relationship and a vector form of Snell's law, wherein the plurality of intersections are a plurality of second feature data points $P'_i$ (i=1, 2 ... K) of the second freeform surface "b"; and obtaining the second freeform surface "b" by surface fitting the plurality of 'second feature data points $P'_i$ (i=1, 2 ... K), wherein an equation of the second freeform surface "b" comprises a base conic term and a freeform surface term;

step (S4), repeating the step (S3) until all the freeform surfaces that need to be solved are obtained, and obtaining a before-iteration off-axial optical system; and step (S5), taking the before-iteration off-axial optical system obtained in step (S4) as the initial system for an iteration process, and obtaining an after-iteration off-axial optical system by multiple iteration.

In step (S1), the initial surface can be a planar surface or a spherical surface. The locations of the plurality of initial surfaces can be selected according to the off-axial optical system actual needs.

In step (S2), a method of selecting the plurality of feature rays $R_i$ (i=1, 2 ... K) comprises: M fields are selected according to the optical systems actual needs, an aperture of each of the M fields is divided into N equal parts, and P feature rays at different aperture positions in each of the N equal parts are selected. As such, K=M×N×P different feature rays corresponding to different aperture positions and different fields are fixed. The aperture can be a circle, a rectangle, a square, an oval or other shapes.

As shown in FIG. 1, in one embodiment, the aperture of each of the M fields is a circle, and a circular aperture of each of the N fields is divided into N angles with equal interval φ, as such, N=2π/φ, and then, P different aperture positions are fixed along a radial direction of each of the N angles. Therefore, K=M×N×P different feature rays corresponding to different aperture positions and different fields are fixed.

Figure 2:
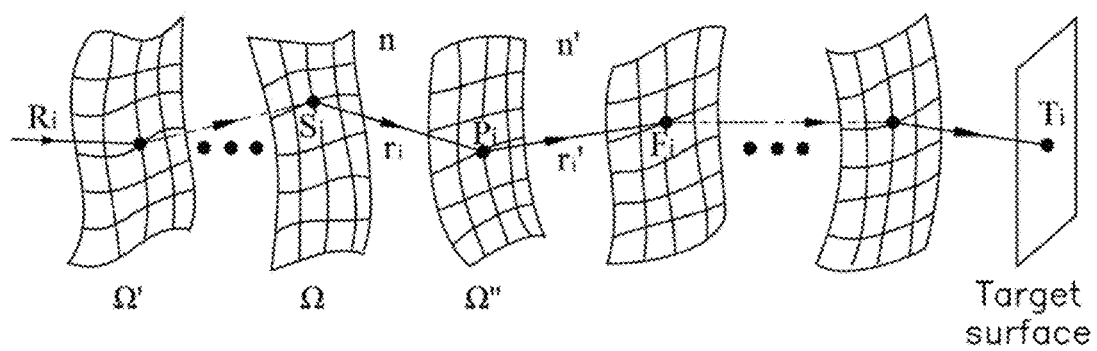
FIG. 2 is a schematic view of start point and end point of one feature ray while solving the feature data points.

Referring to FIG. 2, a surface Ω is defined as the first freeform surface, a surface Ω' is defined as a surface located adjacent to and before the surface Ω, and a surface Ω" is defined as a surface located adjacent to and after the surface. The intersections of the plurality of feature rays $R_i$ (i=1, 2 ... K) with the surface Ω are defined as the first feature data points $P_i$ (i=1, 2 ... K). The first feature data points $P_i$ (i=1, 2 ... K) can be obtained by the intersections of the feature rays $R_i$ (i=1, 2 ... K) with the surface Ω' and the surface Ω". The plurality of feature rays $R_i$ (i=1, 2 ... K) are intersected with the surface Ω' at a plurality of start points $S_i$ (i=1, 2 ... K), and intersected with the surface Ω" at a plurality of end points $E_i$ (i=1, 2 ... K). When the surface Ω and the plurality of feature rays $R_i$ (i=1, 2 ... K) are determined, the plurality of start points $S_i$ (i=1, 2 ... K) of the feature rays $R_i$ (i=1, 2 ... K) can also be determined. The plurality of end points $E_i$ (i=1, 2 ... K) can also be obtained based on the object-image relationship or given mapping relationship. Under ideal conditions, the feature rays $R_i$ (i=1, 2 ... K) emitted from the plurality of start points $S_i$ (i=1, 2 ... K) on the surface Ω'; pass through the first feature data points $P_i$ (i=1, 2 ... K) on the surface Ω; intersect with the surface Ω" at the plurality of end points $E_i$ (i=1, 2 ... K); and finally intersect with the image plane at the plurality of ideal target points $T_{i,ideal}$ (i=1, 2 ... K). If the surface Ω" is the target plane, the plurality of end points $E_i$ (i=1, 2 ... K) are the plurality of ideal target points $I_i$ (i=1, 2 ... K). If there are other surfaces between the surface Ω and the target plane, the plurality of end points $E_i$ (i=1, 2 ... K) are the points on the surface Ω", which make the first variation of the optical path length between the first feature data points $P_i$ (i=1, 2 ... K) and their corresponding target points zero. $\delta S = \delta \int_{P_i}^{T_i} n ds = 0$, wherein ds is the differential elements of the optical path length along the plurality of feature rays $R_i$ (i=1, 2 ... K), n denotes the refractive index of the medium, and δ denotes a differential variation.

The plurality of first feature data points $P_i$ (i=1, 2 ... K) can be obtained by the following two calculating methods.

A first calculating method comprises the following substeps:

step (a): defining a first intersection of a first feature ray $R_1$ and the initial surface as a feature data point $P_1$;

step (b): when i (1≤i≤K−1) first feature data points $P_i$ (1≤i≤K−1) have been obtained, a unit normal vector $\vec{N}_i$ (1≤i≤K−1) at each of the i (1≤i≤K−1) first feature data points $P_i$ (1≤i≤K−1) can be calculated based on a vector form of Snell's Law;

step (c): making a first tangent plane at the i (1≤i≤K−1) first feature data points $P_i$ (1≤i≤K−1) respectively; thus i first tangent planes can be obtained, and i×(K−i) second intersections can be obtained by the i first tangent planes intersecting with remaining (K−i) feature rays; and a second intersection, which is nearest to the i (1≤i≤K−1) first feature data points $P_i$, is fixed from the i×(K−i) second intersections as a next feature data point $P_{i+1}$ (1≤i≤K−1); and step (d): repeating steps (b) and (c), until all the plurality of first feature data points $P_i$ (i=1, 2 ... K) are calculated.

In step (b), the unit normal vector $\vec{N}_i$ (1≤i≤K−1) at each of the feature data point $P_i$ (1≤i≤K−1) can be calculated based on the vector form of Snell's Law. When the first freeform surface is a refractive surface, $$\vec{N}_i = \frac{n'\vec{r}'_i - n\vec{r}_i}{|n'\vec{r}'_i - n\vec{r}_i|} \quad (1)$$

$$\vec{r}_i = \frac{\overrightarrow{P_i S_i}}{|\overrightarrow{P_i S_i}|}$$

is a unit vector along a direction of an incident ray for the first freeform surface;

$$\vec{r}'_i = \frac{\overrightarrow{E_i P_i}}{|\overrightarrow{E_i P_i}|}$$

is a unit vector along a direction for an exit ray of the first freeform surface; and n, n' is refractive index of a media before and after the first freeform surface respectively.

Similarly, when the first freeform surface is a reflective surface, $$\vec{N}_i = \frac{\vec{r}_i' - \vec{r}_i}{|\vec{r}_i' - \vec{r}_i|} \quad (2)$$

The unit normal vector at each of the plurality of first feature data points $P_i$ (i=1, 2 ... K) is perpendicular to the first tangent plane at each of the plurality of first feature data points $P_i$ (i=1, 2 ... K). Thus, the first tangent plane at each of the plurality of first feature data points $P_i$ (i=1, 2 ... K) can be obtained.

The first calculating method comprises a computational complexity formula of $$T(K) = \sum_{i=1}^{K-1} i(K-1) = \frac{1}{6}K^3 - \frac{1}{6}K = O(K^3).$$

When a large quantity of feature rays are used in a design, the first calculating method requires a long computation time.

A second calculating method comprises the following sub-steps:

step (a'): defining a first intersection of a first feature light ray $R_1$ and the initial surface as a feature data point $P_1$;

step (b'): when an ith (1≤i≤K−1) feature data point $P_i$ (1≤i≤K−1) has been obtained, a unit normal vector $\vec{N}_i$ at the ith (1≤i≤K−1) feature data point $P_i$ (1≤i≤K−1) can be calculated based on the vector form of Snell's law;

step (c'): making a first tangent plane through the ith (1≤i≤K−1) feature data point $P_i$ (1≤i≤K−1), and (K−i) second intersections can be obtained by the first tangent plane intersecting with remaining (K−i) feature rays; a second intersection $Q_{i+1}$, which is nearest to the ith (1≤i≤K−1) feature data point $P_i$ (1≤i≤K−1), is fixed; and a feature ray corresponding to the second intersection $Q_{i+1}$ is defined as $R_{i+1}$, a shortest distance between the second intersection $Q_{i+1}$ and the ith feature data point $P_i$(1≤i≤K−1) is defined as $d_i$;

step (d'): making a second tangent plane at (i−1) first feature data points that are obtained before the ith feature data point $P_i$ (1≤i≤K−1) respectively; thus, (i−1) second tangent planes can be obtained, and (i−1) third intersections can be obtained by the (i−1) second tangent planes intersecting with a feature ray $R_{i+1}$; in each of the (i−1) second tangent planes, each of the (i−1) third intersections and its corresponding feature data point form an intersection pair; the intersection pair, which has the shortest distance between a third intersection and its corresponding feature data point, is fixed; and the third intersection and the shortest distance is defined as $Q'_{i+1}$ and $d'_i$ respectively;

step (e'): comparing $d_i$ and $d'_i$, if $d_i \le d'_i$, $Q_{i-1}$ is taken as the next feature data point $P_{i-1}$ (1≤i≤K−1); otherwise, $Q'_{i+1}$ is taken as the next feature data point $P_{i+1}$ (1≤i≤K−1); and step (f'): repeating steps from (b') to (e'), until the plurality of first feature data points $P_i$ (i=1, 2 ... K) are all calculated.

In step (b'), a calculating method of the unit normal vector $\vec{N}_i$ at the ith (1≤i≤K−1) feature data point $P_i$ (1≤i≤K−1) is the same as the first calculating method.

A second calculating method comprises a computational complexity formula of $$T(K) = \sum_{i=1}^{K-1} K - i + i - 1 = (K-1)^2 O(K^3).$$

When a large quantity of feature rays are used in a design, the computational complexity of the second calculating method is much smaller than the computational complexity of the first calculating method.

In step (S2), the equation of the first freeform surface "a" can be expressed as follows:

$$z(x, y) = \frac{c(x^2 + y^2)}{1 + \sqrt{1 - (1+k)c^2(x^2 + y^2)}} + \sum_{j=1}^{N} A_j g_j(x, y),$$

wherein, $$\frac{c(x^2 + y^2)}{1 + \sqrt{1 - (1+k)c^2(x^2 + y^2)}}$$

is the conic term, c is the curvature of the conic surface at the vertex, k is the conic constant;

$$\sum_{j=1}^{N} A_j g_j(x, y)$$

is the freeform surface term, $A_i$ represents the $i^{th}$ term coefficient. The freeform surface term can be XY polynomials, Zernike polynomials, Chebyshev polynomials, or the like.

In one embodiment, the space of the initial system is defined as a first three-dimensional rectangular coordinates system. The propagation direction of beams is defined as a Z-axis, and the Z-axis is perpendicular to an XOY plane.

A method of surface fitting the plurality of first feature data points $P_i$ (i=1, 2 ... K) comprises:

step (21): surface fitting the plurality of first feature data points $P_i$ (i=1, 2 ... K) to a sphere in the first three-dimensional rectangular coordinates system, and obtaining a curvature c of the sphere and the center of curvature ($x_c$, $y_c$, $z_c$) corresponding to the curvature c of the sphere;

step (S22): defining the feature data point ($x_o$, $y_o$, $z_o$) corresponding to a chief ray of the central field angle among the entire field-of-view (FOV) as the vertex of the sphere, defining a second three-dimensional rectangular coordinates system by the vertex of the sphere as origin and a line passing through the center of curvature and the vertex of the sphere as a Z'-axis;

step (S23): transforming the coordinates ($x_i$, $y_i$, $z_i$) and the normal vector ($\alpha_i$, $\beta_i$, $\gamma_i$), of the plurality of first feature data points $P_i$ (i=1, 2 ... K) in the first three-dimensional rectangular coordinates system, into the coordinates ($x'_i$, $y'_i$, $z'_i$) and the normal vector ($\alpha'_i$, $\beta'_i$, $\gamma'_i$), of the plurality of first feature data points $P_i$ (i=1, 2 ... K) in the second three-dimensional rectangular coordinates system;

step (S24): fitting the plurality of first feature data points $P_i$ (i=1, 2 ... K) into a conic surface equation of a conic surface in the second three-dimensional rectangular coordinates system, based on the coordinates ($x'_i$, $y'_i$, $z'_i$) and the curvature c of the sphere, and obtaining the conic constant k; and step (S25): removing the coordinates and the normal vector of the plurality of first feature data points $P_i$ (i=1, 2 ... K), on the conic surface in the second three-dimensional rectangular coordinates system, from the coordinates $(x'_i, y'_i, z'_i)$ and the normal vector $(\alpha'_i, \beta'_i, \gamma'_i)$, to obtain a residual coordinate and a residual normal vector; and fitting the residual coordinate and the residual normal vector to obtain a polynomial surface equation; the equation of the first freeform surface can be obtained by adding the conic surface equation and the polynomial surface equation.

Generally, the optical systems are symmetric about the YOZ plane. Therefore, the tilt angle θ of the sphere, in the Y'O'Z' plane of the second three-dimensional rectangular coordinates system relative to in the YOZ plane of the first three-dimensional rectangular coordinates system, is:

$$\theta = \arctan\left(\frac{y_o - y_c}{z_o - z_c}\right).$$

The relationship between the coordinates $(x'_i, y'_i, z'_i)$ and the coordinates $(x_i, y_i, z_i)$ of each of the plurality of first feature data points $P_i$ (i=1, 2 ... K) can be expressed as following:

$$\begin{cases} x'_i = x_i - x_o \\ y'_i = (y_i - y_o)\cos\theta - (z_i - z_o)\sin\theta \\ z'_i = (y_i - y_o)\sin\theta + (z_i - z_o)\cos\theta \end{cases}.$$

The relationship between the normal vector $(\alpha'_i, \beta'_i, \gamma'_i)$ and the normal vector $(\alpha_i, \beta_i, \gamma_i)$ of each of the plurality of first feature data points $P_i$ (i=1, 2 ... K) can be expressed as following:

$$\begin{cases} \alpha'_i = \alpha_i \\ \beta'_i = \beta_i\cos\theta - \gamma_i\sin\theta \\ \gamma'_i = \beta_i\sin\theta + \gamma_i\cos\theta \end{cases}.$$

In the second three-dimensional rectangular coordinates system, the coordinates and the normal vector of the plurality of first feature data points $P_i$ (i=1, 2 ... K) on the conic surface are defined as $(x'_i, y'_i, z'_{is})$ and $(\alpha'_{is}, \beta'_{is}, \gamma'_{is})$ respectively. The Z'-axis component of the normal vector is normalized to −1. The residual coordinate $(x''_i, y''_i, z''_i)$ and the residual normal vector $(\alpha''_i, \beta''_i, -1)$ can be obtained, wherein, $(x''_i, y''_i, z''_i) =$ $(x'_i, y'_i, z'_i - z'_{is})$ and $(\alpha''_i, \beta''_i, -1) = \left(-\frac{\alpha'_i}{\gamma'_i} + \frac{\alpha'_{is}}{\gamma'_{is}}, -\frac{\beta'_i}{\gamma'_i} + \frac{\beta'_{is}}{\gamma'_{is}}, -1\right).$ In step S(25), a method of surface fitting the residual coordinate and the residual normal vector comprises:

step (S251): in the second three-dimensional rectangular coordinates system, expressing a polynomial surface by the polynomial surface equation leaving out the conic surface term, the polynomial surface can be expressed in terms of the following equation:

$$z = f(x, y; P) = \sum_{j=1}^{J} P_j g_j(x, y),$$

wherein $g_j(x, y)$ is one item of the polynomial, and $P=(p_1, p_2, L, p_J)^T$ is the coefficient sets;

step (S252): acquiring a first sum of squares $d_1(P)$, of residual coordinate differences in z' direction between the residual coordinate value $(x''_i, y''_i, z''_i)$ (i=1, 2, ..., K) and the freeform surface; and a second sum of squares $d_2(P)$, of modulus of vector differences between the residual normal vector $N_i=(\alpha''_i, \beta''_i, -1)$ (i=1, 2, ..., K) and a normal vector of the freeform surface, wherein the first sum of squares $d_1(P)$ is expressed in terms of a first equation:

$$d_1(P) = \sum_{i=1}^{I} [z_i - f(x''_i, y''_i; P)]^2 = (Z - A_1 P)^T(Z - A_1 P),$$

and the second sum of squares $d_2(P)$ is expressed in terms of a second equation:

$$d_2(P) = \sum_{i=1}^{I} \{[u_i - f_{x''}(x''_i, y''_i; P)]^2 + [v_i - f_{y''}(x''_i, y''_i; P)]^2\} =$$
$$(U - A_2 P)^T(U - A_2 P) + (V - A_3 P)^T(V - A_3 P)$$

wherein, $Z = (z_1, z_2, L, z_I)^T$, $U = (u_1, u_2, L, u_I)^T$, $V = (v_1, v_2, L, v_I)^T$, $$A_1 = \begin{pmatrix} g_1(x''_1, y''_1) & g_2(x''_1, y''_1) & \cdots & g_J(x''_1, y''_1) \\ g_1(x''_2, y''_2) & g_2(x''_2, y''_2) & \cdots & g_J(x''_2, y''_2) \\ \vdots & \vdots & & \vdots \\ g_1(x''_I, y''_I) & g_2(x''_I, y''_I) & \cdots & g_J(x''_I, y''_I) \end{pmatrix},$$

$$A_2 = \begin{pmatrix} g_1^x(x''_1, y''_1) & g_2^x(x''_1, y''_1) & \cdots & g_J^x(x''_1, y''_1) \\ g_1^x(x''_2, y''_2) & g_2^x(x''_2, y''_2) & \cdots & g_J^x(x''_2, y''_2) \\ \vdots & \vdots & & \vdots \\ g_1^x(x''_I, y''_I) & g_2^x(x''_I, y''_I) & \cdots & g_J^x(x''_I, y''_I) \end{pmatrix},$$

$$A_3 = \begin{pmatrix} g_1^y(x''_1, y''_1) & g_2^y(x''_1, y''_1) & \cdots & g_J^y(x''_1, y''_1) \\ g_1^y(x''_2, y''_2) & g_2^y(x''_2, y''_2) & \cdots & g_J^y(x''_2, y''_2) \\ \vdots & \vdots & & \vdots \\ g_1^y(x''_I, y''_I) & g_2^y(x''_I, y''_I) & \cdots & g_J^y(x''_I, y''_I) \end{pmatrix};$$

step (S253): obtaining an evaluation function, $P = (A_1^T A_1 + w A_2^T A_2 + w A_3^T A_3)^{-1} \cdot (A_1^T Z + w A_2^T U + w A_3^T V),$ wherein w is a weighting greater than 0;

step (S254): selecting different weightings w and setting a gradient $\nabla f(P)$ of the evaluation function equal to 0, to obtain a plurality of different values of P and a plurality of freeform surface shapes z=f(x, y; P) corresponding to each of the plurality of different values of P; and step (S255): choosing a final freeform surface shape $\Omega_{opt}$ which has a best imaging quality from the plurality of freeform surface shapes z=f(x, y; P).

In step (S3), the plurality of second feature data points $P'_i$ (i=1, 2 ... K) can be solved and the second freeform surface "b" can be obtained by the same methods provided in the step (S2).

In step (S4), the other freeform surfaces can be obtained by the same methods provided in the step (S2). The number of all of the freeform surfaces that need to be solved can be the same or less than the number of the plurality of initial surfaces of step (S1). When the step (S3) is repeated to obtain other freeform surfaces, the freeform surfaces that have been obtained and some of the plurality of initial surfaces that does not corresponds to the obtained freeform surfaces are kept unchanged.

In step S5, the iteration process can be carried out by the following two methods.

A first method for iteration comprises the following sub-steps:

step (S51): a plurality of actual intersections of the plurality of feature rays $R_i$ (i=1, 2 . . . K) with the first freeform surface "a" are solved according to the equation of the first freeform surface "a" and defined as the first feature data points $P_i$ (i=1, 2, . . . , K), a unit normal vector at each of the first feature data points $P_i$ (i=1, 2, . . . , K) is calculated, and the first feature data points $P_i$ (i=1, 2, . . . , K) are surface fitted with the method in step (S2), to obtain an after-iteration first freeform surface "a'";

step (S52): a plurality of actual intersections of the plurality of feature rays $R_i$ (i=1, 2 . . . K) with the second freeform surface "b" are solved according to the equation of the second freeform surface "b" and defined as the second feature data points $P'_i$ (i=1, 2, . . . , K), a unit normal vector at each of the second feature data points $P'_i$ (i=1, 2, . . . , K) is calculated, and the second feature data points $P'_i$ (i=1, 2, . . . , K) are surface fitted with the method in step (S3), to obtain an after-iteration second freeform surface "b'"; and step (S53): repeating the step (S53) until all the freeform surfaces obtained in step (S4) are solved and surface fitted again to obtain all the after-iteration freeform surfaces, thereby an after-iteration off-axial optical system is obtained and the iteration process is performed once; and step (S54): the after-iteration off-axial optical system obtained in step (S53) is used as the initial system, and a plurality of other iteration process are performed by repeating step (S51) to step (S53), until a plurality of actual intersections of the plurality of feature rays $R_i$ (i=1, 2 . . . K) with the target surface are close to the ideal target points, the iteration process is finished.

A second method for iteration comprises the following sub-steps:

step (S51'), repeating step (S2) to step (S4), thereby an after-iteration off-axial optical system is obtained and the iteration process is performed once;

step (S52'), the after-iteration off-axial optical system generated by step (S51') is taken as the initial system, and repeating step (S51'), until the plurality of actual intersections of the plurality of feature rays $R_i$ (i=1, 2 . . . K) with the target surface are close to the ideal target points, the iteration process is finished.

Compared to the second method for iteration, the first method for iteration is simpler and takes shorter time.

Figure 3:
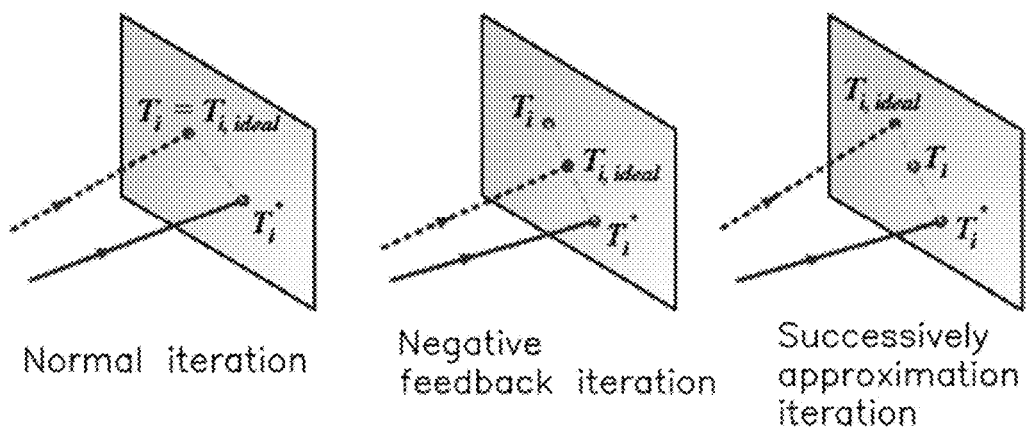
FIG. 3 shows a schematic view of one embodiment of types of the iterative process of off-axial optical system with freeform surface.

FIG. 3 illustrates that the type of the iteration can be normal iteration, negative feedback iteration, or successively approximation iteration. The negative feedback iteration is faster. The successively approximation iteration is more stable.

In the normal iteration, the target point $T_i$ is the ideal target point $T_{i,ideal}$.

$$T_i = T_{i,ideal}.$$

In negative feedback iteration, the negative feedback function can be written as:

$$T_i = \begin{cases} T_{i,ideal} + \varepsilon\Delta & \text{if}(T_{i,ideal} - T_i^*) > \Delta \\ T_{i,ideal} + \varepsilon(T_{i,ideal} - T_i^*) & \text{if} -\Delta \leq (T_{i,ideal} - T_i^*) \leq \Delta, \\ T_{i,ideal} - \varepsilon\Delta & \text{if}(T_{i,ideal} - T_i^*) < -\Delta \end{cases}$$

wherein $\varepsilon$ is the feedback coefficient, and $\varepsilon$ is larger than zero; $T_i^*$ is the actual intersections of the plurality of feature rays $R_i$ (i=1, 2 . . . K) with the target surface before the current iteration and after the previous iteration; $\Delta$ is a feedback threshold, and $\Delta$ is larger than zero, the feedback threshold is conducive to avoid instability of the iterative process caused by a dramatic change of $T_i$ due to large deviation between $T_i^*$ and $T_{i,ideal}$.

In the successively approximation iteration, $$T_i = T_i^* + \rho(T_{i,ideal} - T_i^*)$$

wherein $\rho$ is the approximation coefficient, and $\rho$ is larger than zero.

Furthermore, a step of optimizing the after-iteration off-axial optical system obtained in step (S5) by using the after-iteration off-axial optical system as a starting point of optimization can be performed.

Figure 4:
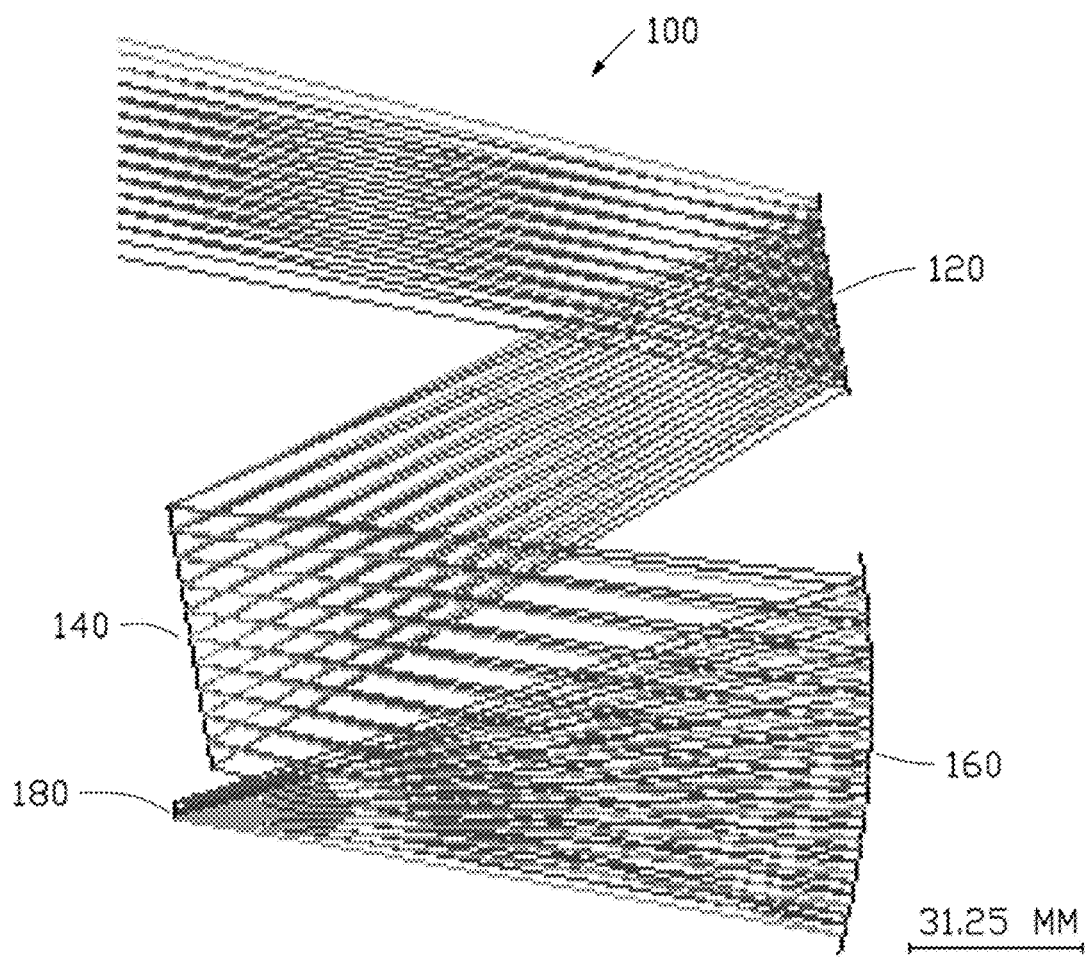
FIG. 4 shows a light path schematic view of one embodiment of an off-axial three-mirror optical system with freeform surface.

Referring to FIG. 4, an design example of an off-axial three-mirror optical system 100 with freeform surface of one embodiment is provided. The off-axial three-mirror optical system 100 comprises a primary mirror 120, a secondary mirror 140 and a tertiary mirror 160 located in that order and spaced from each other. The secondary mirror 140 is used as stop surface. The primary mirror 120 and the tertiary mirror 160 are freeform surfaces. The secondary mirror 140 is planar surface. The feature rays exiting from the object space would be successively reflected by the primary mirror 120, the secondary mirror 140 and the tertiary mirror 160 to form an image on a target surface 180. The parameters of the off-axial three-mirror optical system 100 are shown in table 1 below.

TABLE 1 parameters of the off-axial three-mirror optical system 100

| Parameters | Values |
| --- | --- |
| Field of View | 3° × 3° |
| F-Number | 2 |
| Wave Range | LWIR (8-12 μm) |
| Focal-Length | 60 mm |
| Detector Pixel Size | 30 μm × 30 μm |
| Pupil Diameter | 30 mm |

The method for designing an off-axial three-mirror optical system 100 comprises the following steps:

step (S1'), establishing an initial planar surface system, wherein the initial planar surface system comprises a primary mirror initial planar surface, a secondary mirror initial planar surface and a tertiary mirror initial planar surface;

step (S2'), keeping the primary mirror initial planar surface and the secondary mirror initial planar surface unchanged, selecting a plurality of feature rays, calculating a plurality of intersections of the plurality of feature rays with a before-iteration tertiary mirror 260 point by point based on a given object-image relationship and a vector form of Snell's law, wherein the plurality of intersections are a plurality of first feature data points of the before-iteration tertiary mirror 260; and obtaining the before-iteration tertiary mirror 260 by surface fitting the plurality of first feature data points;

step (S3'), keeping the before-iteration tertiary mirror 260 and the secondary mirror initial planar surface unchanged, selecting a plurality of feature rays, calculating a plurality of intersections of the plurality of feature rays with a before-iteration primary mirror 220 point by point based on a given object-image relationship and a vector form of Snell's law, wherein the plurality of intersections are a plurality of second feature data points of the before-iteration primary mirror 220; and obtaining the before-iteration primary mirror 220 by surface fitting the plurality of second feature data points, thereby obtain a before-iteration off-axial three-mirror optical system;

step (S4'), taking the before-iteration off-axial three-mirror optical system obtained in step (S3') as the initial system for an iteration process, and obtaining an after-iteration off-axial three-mirror optical system by multiple iteration; and step (S5'), optimizing the after-iteration off-axial three-mirror optical system obtained in step (S4') to obtain the off-axial three-mirror optical system 100.

In step (S2'), six off-axial fields are selected. The six off-axial fields are (0°, −10.5°) (0°, −12°) (0°, −13.5°) (1.5°, −10.5°) (1.5°, −12°) (1.5°, −13.5°). 112 feature rays are selected in each off-axial field, and 672 feature rays that corresponds different pupil positions and different off-axial fields are selected. The plurality of first feature data points of the before-iteration tertiary mirror 260 are obtained by the second calculating method described above. The method of fitting the plurality of first feature data points of the before-iteration tertiary mirror 260 is the same as the fitting method of step (S2).

In step (S3'), the plurality of second feature data points of the before-iteration primary mirror 220 are obtained by the second calculating method described above. The method of fitting the plurality of second feature data points of the before-iteration primary mirror 220 is the same as the fitting method of step (S2).

In step (S4'), the iteration process comprises:

step (S41'), a plurality of actual intersections of the plurality of feature rays with the before-iteration tertiary mirror are solved according to the equation of the before-iteration tertiary mirror and defined as the first feature data points, a unit normal vector at each of the first feature data points is calculated, and the first feature data points are surface fitted with the method in step (S2'), to obtain an after-iteration tertiary mirror;

step (S42'), a plurality of actual intersections of the plurality of feature rays with the before-iteration primary mirror are solved according to the equation of the before-iteration primary mirror and defined as the second feature data points, a unit normal vector at each of the second feature data points is calculated, and the second feature data points are surface fitted with the method in step (S3'), to obtain an after-iteration primary mirror, thereby an after-iteration off-axial three-mirror optical system is obtained and the iteration process is performed once;

step (S43'): the after-iteration off-axial three-mirror optical system obtained in step (S42') is used as the initial system, and a plurality of other iteration process are performed by repeating step (S41') to step (S42'), until a plurality of actual intersections of the plurality of feature rays with the target surface are close to the ideal target points, the iteration process is finished.

Figure 5:
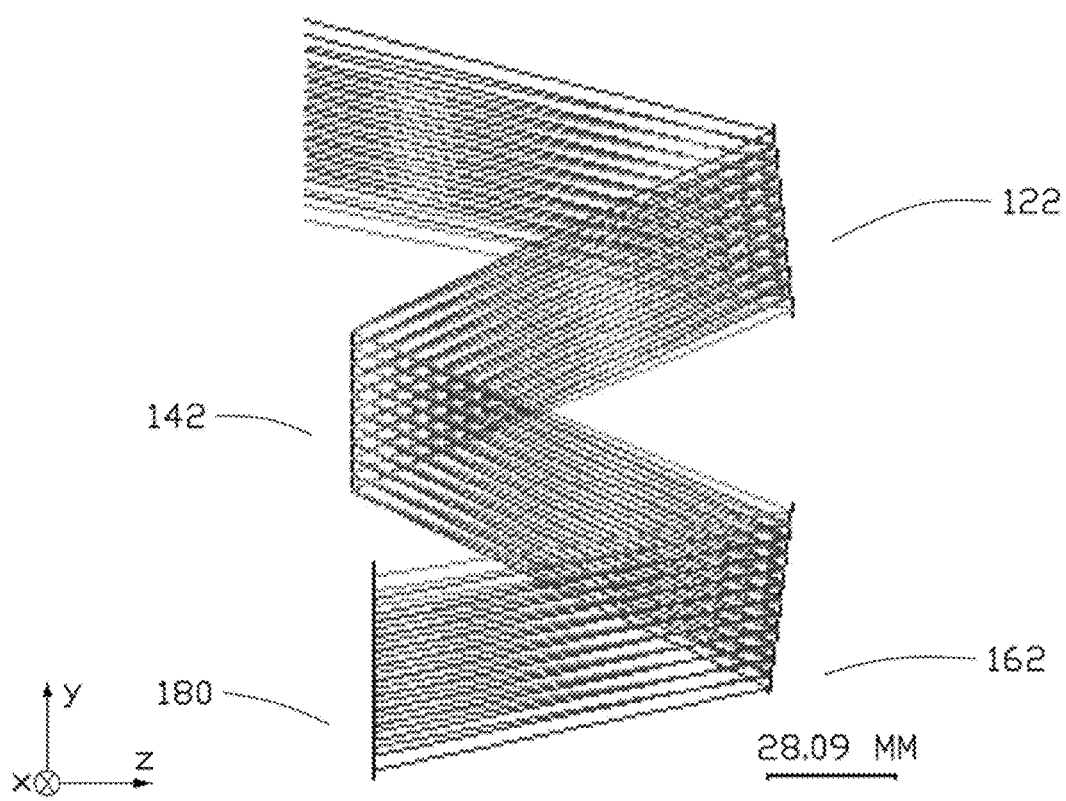
FIG. 5 shows a light path schematic view of one embodiment of an initial system of an off-axial three-mirror optical system with freeform surface.

Referring to FIG. 5, a light path schematic view of an initial planar surface system in step (S1') is shown. The initial planar surface system comprises a primary mirror initial planar surface 122, a secondary mirror initial planar surface 142 and a tertiary mirror initial planar surface 162. It is shown that the beams of each field does not form focus on the target surface 180 and have a deviation from ideal target point.

Figure 6:
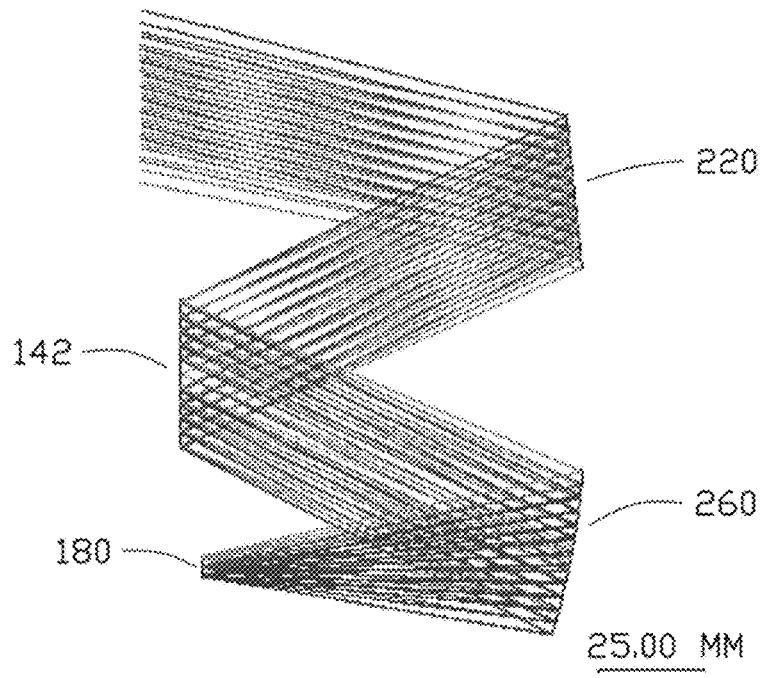
FIG. 6 shows a light path schematic view before iteration process of one embodiment of an off-axial three-mirror optical system with freeform surface.
Figure 7:
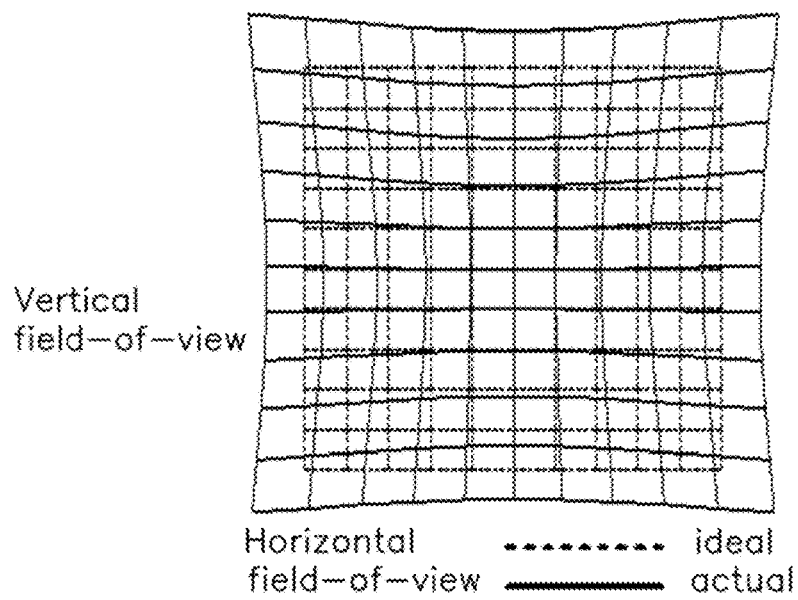
FIG. 7 shows a distortion grid view before iteration process of one embodiment of an off-axial three-mirror optical system with freeform surface.

Referring to FIG. 6, a light path schematic view of the before-iteration off-axial three-mirror optical system of step (S3') is shown. The before-iteration off-axial three-mirror optical system comprises the before-iteration primary mirror 220, the secondary mirror initial planar surface 142 and the before-iteration tertiary mirror 260. It is shown that the beams of each field can focus roughly on the ideal target point on the target surface 180. Thus, the before-iteration primary mirror 220 and the before-iteration tertiary mirror 260 obtained from the methods above can improve the imaging quality of the off-axial three-mirror optical system. Referring to FIG. 7, a distortion grid view of the before-iteration off-axial three-mirror optical system of step (S3') is shown. It is shown that the before-iteration off-axial three-mirror optical system of step (S3') has a relatively high distortion, and a maximum absolute distortion 0.6 mm.

Figure 8:
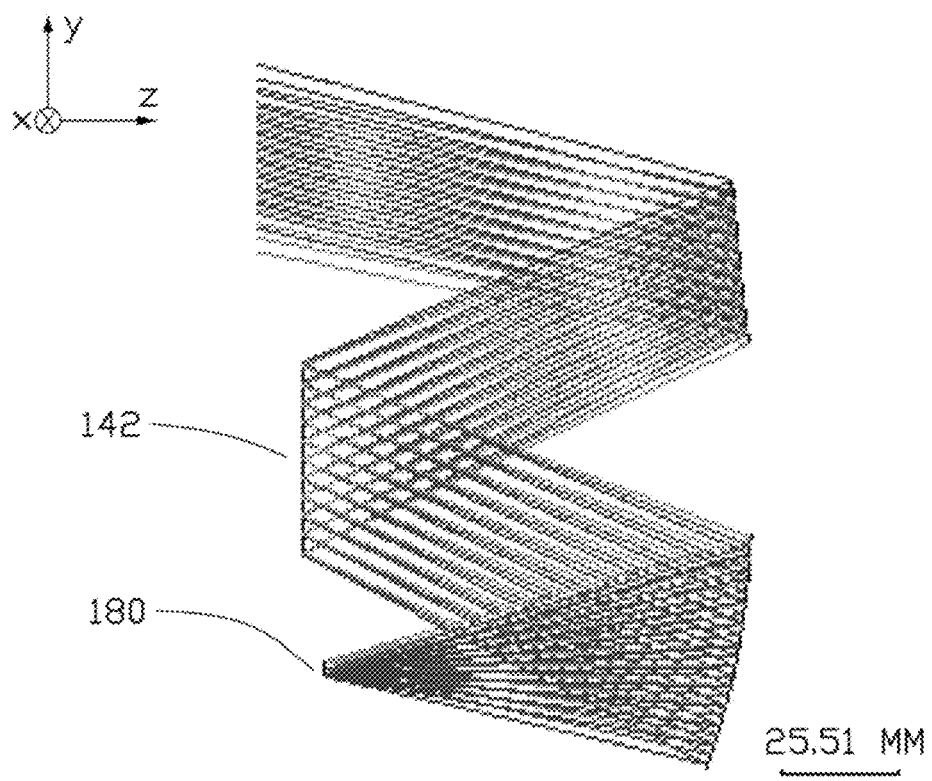
FIG. 8 shows a light path schematic view after iteration process of one embodiment of an off-axial three-mirror optical system with freeform surface.
Figure 9:
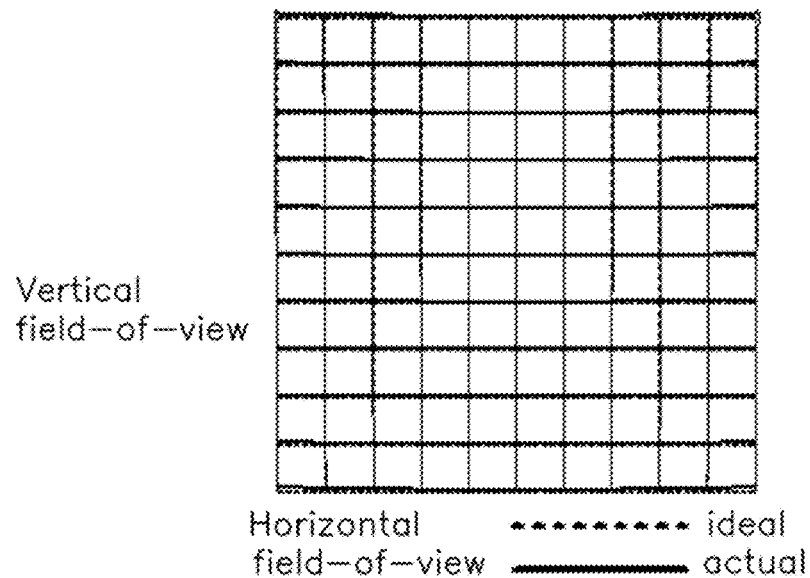
FIG. 9 shows a distortion grid view after iteration process of one embodiment of an off-axial three-mirror optical system with freeform surface.

Referring to FIG. 8, a light path schematic view of the after-iteration off-axial three-mirror optical system of step (S4') is shown. The after-iteration off-axial three-mirror optical system of step (S4') is obtained by 30 times normal iteration of the before-iteration off-axial three-mirror optical system of step (S3'). It is shown that the beams of each field can substantially focus on the ideal target point on the target surface 180. Referring to FIG. 9, a distortion grid view of the after-iteration off-axial three-mirror optical system of step (S4') is shown. It is shown that the after-iteration off-axial three-mirror optical system of step (S4') has almost no distortion, and a maximum absolute distortion 0.0346 mm. Compare the before-iteration off-axial three-mirror optical system of step (S3'), the distortion of after-iteration off-axial three-mirror optical system of step (S4') reduces 94.2%.

Figure 10:
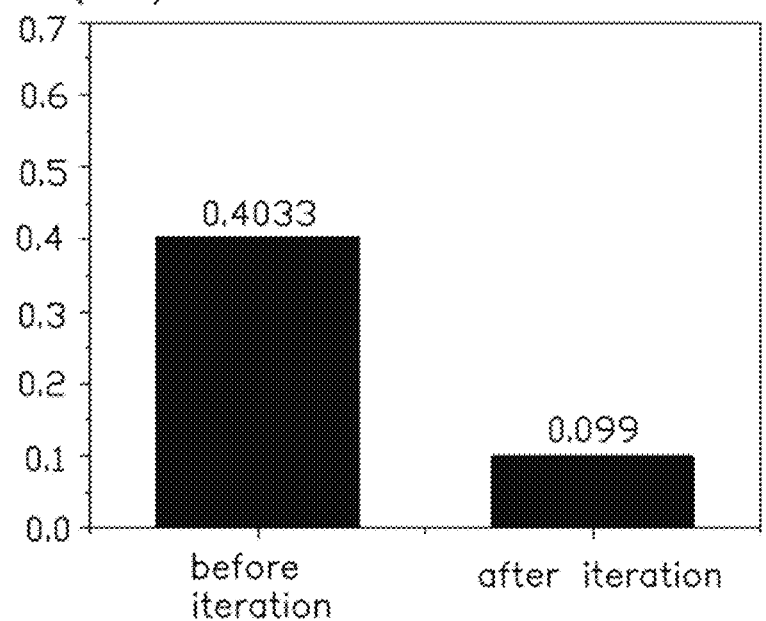
FIG. 10 shows average RMS spot diameters before and after iteration process of one embodiment of an off-axial three-mirror optical system with freeform surface.

Referring to FIG. 10, average RMS spot diameters of the before-iteration off-axial three-mirror optical system of step (S3') and the after-iteration off-axial three-mirror optical system of step (S4') is shown. It is shown that the average RMS spot diameter of the before-iteration off-axial three-mirror optical system of step (S3') is about 0.4033 mm. However, the average RMS spot diameter of the after-iteration off-axial three-mirror optical system of step (S4') is only 0.099 mm. Compare the before-iteration off-axial three-mirror optical system of step (S3'), the average RMS spot diameter of after-iteration off-axial three-mirror optical system of step (S4') reduces 75.4%.

The RMS value $\sigma_{RMS}$ of the distance between the ideal target points and the actual intersection of the plurality of feature rays with the target surface is used to describe the iteration effect. The smaller the $\sigma_{RMS}$, the higher the imaging quality of the off-axial three-mirror optical system obtained.

$$\sigma_{RMS} = \sqrt{\frac{\sum_{m=1}^{K} \sigma_m^2}{K}},$$

where, K is the number of the feature rays, $\sigma_m$ is the distance between the ideal target points and the actual intersection of the $m^{th}$ feature ray.

Figure 11:
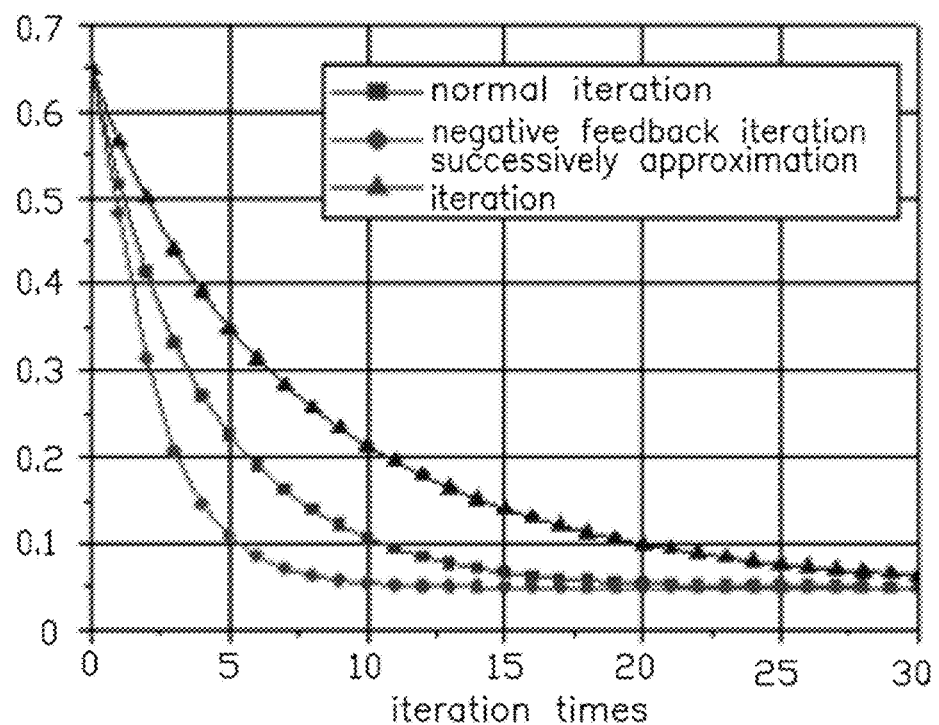
FIG. 11 shows a relationship between a RMS value $\sigma_{RMS}$ of the distance between the ideal target points and the actual intersection of the plurality of feature rays with the target surface and the times of iteration process of one embodiment of an off-axial three-mirror optical system with freeform surface.

Referring to FIG. 11, a relationship between the $\sigma_{RMS}$ and the times of iteration process respectively at different iteration types of normal iteration, negative feedback iteration, and successively approximation iteration is shown, where $\varepsilon=0.3$, $\rho=0.7$. It is shown that after 30 times normal iterations, the $\sigma_{RMS}$ reduces 92.4%. Thus, the iteration process can obviously improve the imaging quality of the off-axial three-mirror optical system.

Figure 12:
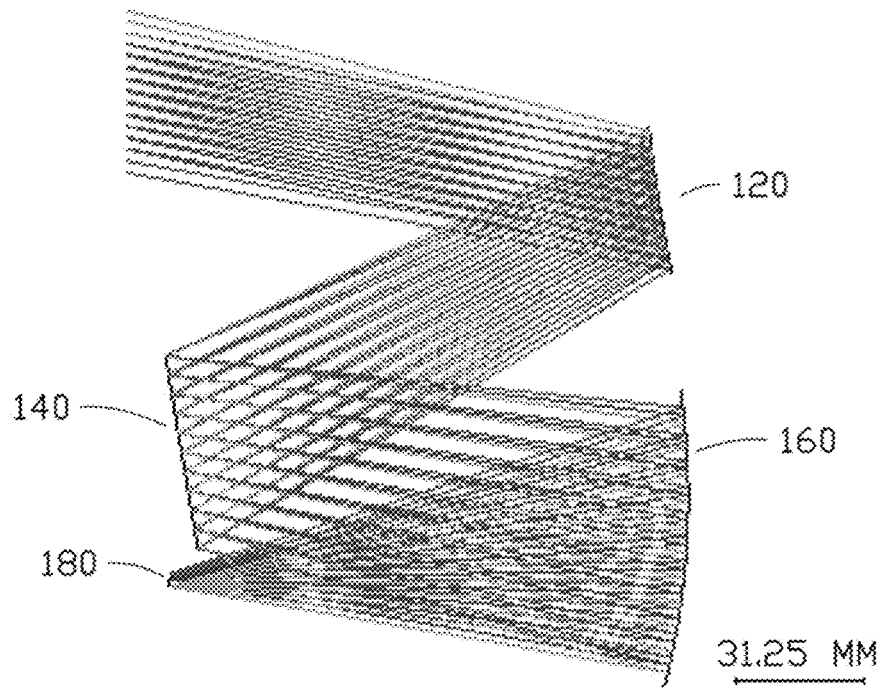
FIG. 12 shows a light path schematic view of one embodiment of an optimized off-axial three-mirror optical system with freeform surface.

Referring to FIG. 12, a light path schematic view of the after-iteration off-axial three-mirror optical system of step (S4') after optimization is shown. It is shown that the imaging quality is further improved.

Figure 13:
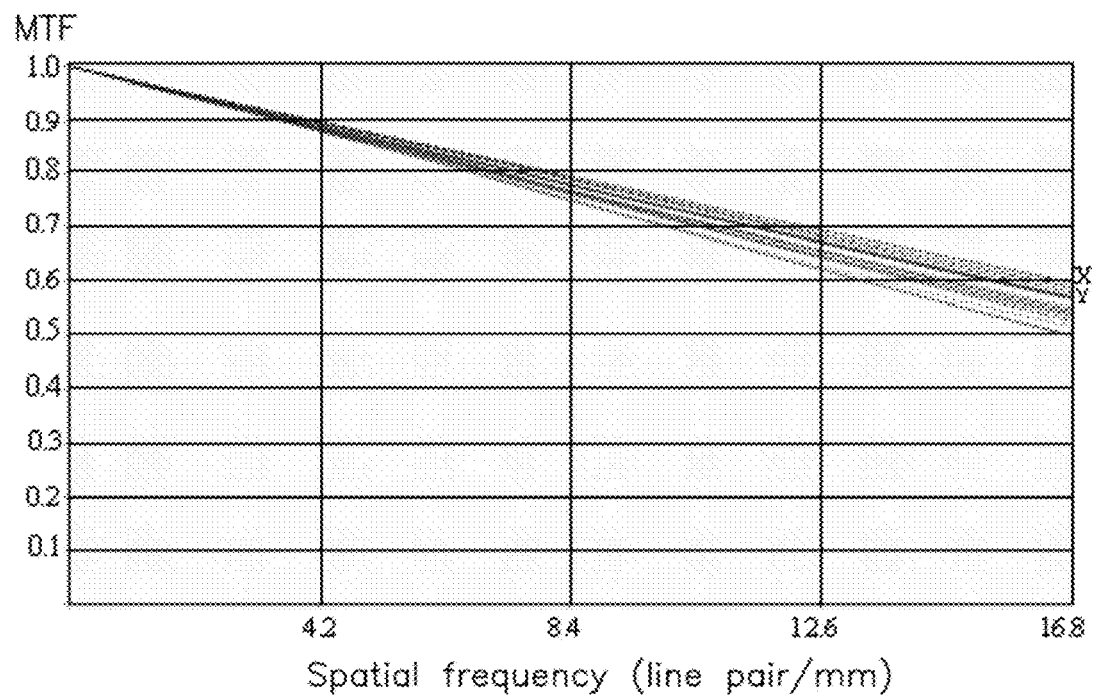
FIG. 13 shows a modulation transfer function (MTF) curve of one embodiment of an optimized off-axial three-mirror optical system with freeform surface.
Figure 14:
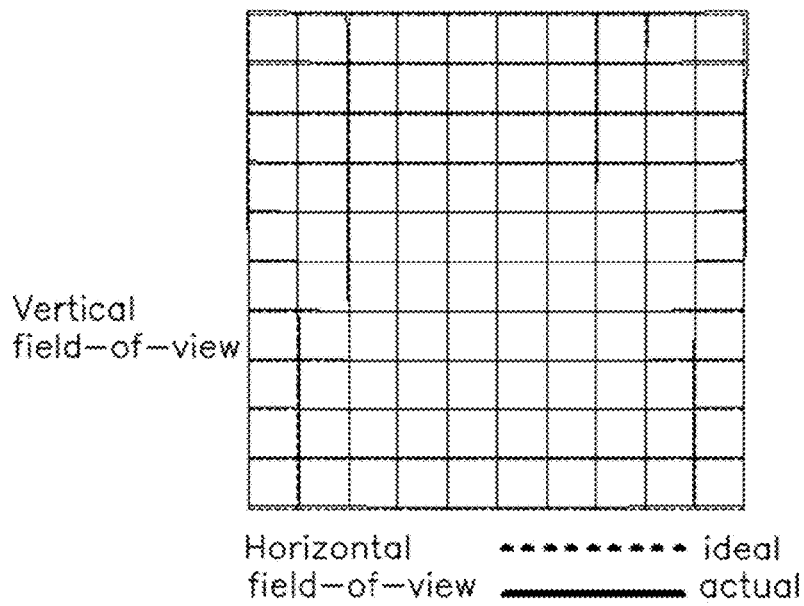
FIG. 14 shows a distortion grid view of one embodiment of an optimized off-axial three-mirror optical system with freeform surface.

Referring to FIG. 13, a MTF curve under long wave infrared region of the system after optimizing the after-iteration off-axial three-mirror optical system of step (S4') is shown. It is shown that the MTF curve of each field is closes to the diffraction limitation, the imaging quality is further improved. Referring to FIG. 14, a distortion grid of the after-iteration off-axial three-mirror optical system of step (S4') after optimization is shown. It is shown that the after-iteration off-axial three-mirror optical system of step (S4') after optimization has almost no distortion.

The method for designing off-axial optical system with freeform surface can be implemented via computer software. Furthermore, an off-axial optical system with freeform surface can be made according to the designing.

The method for designing off-axial optical system with freeform surface can have many advantages. First, the method considers both the coordinates and the normal vectors of the plurality of feature data points, therefore, the shape of the off-axial optical system with freeform surfaces designed by the method is accurate. And the method can also improve the optical properties of the off-axial optical system with freeform surfaces. Second, two three-dimensional rectangular coordinates systems are defined, after a sphere is obtained in the first three-dimensional rectangular coordinates system, the coordinates and the normal vector of the plurality of feature data points in the first three-dimensional rectangular coordinates system are transformed into the second three-dimensional rectangular coordinates system, then the freeform surfaces of the off-axial optical system are obtained by surface fitting. The method is more precisely compared to conventional methods. Third, the off-axial optical system with freeform surfaces are designed by iteration steps, the plurality of actual intersections of the plurality of feature rays with the target surface are close to the ideal target points, therefore, the image quality of the off-axial optical system with freeform surfaces is high, and distortion and average RMS spot diameters of the off-axial optical system with freeform surfaces is reduced.

It is to be understood that the above-described embodiments are intended to illustrate rather than limit the disclosure. Any elements described in accordance with any embodiments is understood that they can be used in addition or substituted in other embodiments. Embodiments can also be used together. Variations may be made to the embodiments without departing from the spirit of the disclosure. The above-described embodiments illustrate the scope of the disclosure but do not restrict the scope of the disclosure.

Depending on the embodiment, certain of the steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

What is claimed is:

1. A method for designing three-dimensional freeform surface of an off-axial optical system comprising:
step (S1), establishing a first initial system, wherein the first initial system comprises a plurality of initial surfaces, and each of the plurality of initial surfaces corresponds to one freeform surface of the off-axial optical system;
step (S2), a Nth freeform surface of the off-axial optical system that need to be solved is selected, wherein N=1, keeping the plurality of initial surfaces unchanged, selecting a plurality of feature rays $R_i$ (i=1, 2 . . . K), calculating a Nth plurality of intersections of the plurality of feature rays $R_i$ (i=1, 2 . . . K) with the Nth freeform surface point by point based on a given object-image relationship and a vector form of Snell's law, wherein the Nth plurality of intersections are a Nth plurality of feature data points $P_i$ (i=1, 2 . . . K) of the Nth freeform surface; and obtaining a Nth equation of the Nth freeform surface by surface fitting the Nth plurality of feature data points $P_i$ (i=1, 2 . . . K), wherein the Nth equation of the Nth freeform surface comprises a Nth base conic term and a Nth freeform surface term; wherein the surface fitting the Nth plurality of feature data points $P_i$ (i=1, 2 . . . K) comprises:
step (21): surface fitting the Nth plurality of feature data points $P_i$ (i=1, 2 . . . K) to a sphere in a first three-dimensional rectangular coordinates system, and obtaining a curvature c of the sphere and a center of curvature ($x_c$, $y_c$, $z_c$) corresponding to the curvature c of the sphere;
step (S22): defining a feature data point ($x_0$, $y_0$, $z_0$) corresponding to a chief ray of a central field angle among entire field-of-view as a vertex of the sphere, defining a second three-dimensional rectangular coordinates system by the vertex of the sphere as origin and a line passing through the center of curvature and the vertex of the sphere as a Z'-axis; wherein in the second three-dimensional rectangular coordinates system, the plurality of third coordinates and the plurality of third normal vectors of the Nth plurality of feature data points $P_i$ (i=1, 2 . . . K) on the conic surface are defined as ($x'_i$, $y'_i$, $z'_{is}$) and ($\alpha'_{is}$, $\beta'_{is}$, $\gamma'_{is}$) respectively, a Z'-axis component of the plurality of residual normal vectors are normalized to −1, the plurality of residual coordinates ($x''_i$, $y''_i$, $z''_i$) (i=1, 2, . . . , K) satisfy ($x''_i$, $y''_i$, $z''_i$)=($x'_i$, $y'_i$, $z'_i-z_{is}'$), and the plurality of residual normal vectors $N_i=(\alpha''_i, \beta''_i, -1)$ (i=1, 2, . . . , K) satisfy $$(\alpha''_i, \beta''_i, -1) = \left(-\frac{\alpha'_i}{\gamma'_i} + \frac{\alpha'_{is}}{\gamma'_{is}}, -\frac{\beta'_i}{\gamma'_i} + \frac{\beta'_{is}}{\gamma'_{is}}, -1\right);$$

step (S23): transforming a first coordinates ($x_i$, $y_i$, $z_i$) and a first normal vectors ($\alpha_i$, $\beta_i$, $\gamma_i$), of the Nth plurality of feature data points $P_i$ (i=1, 2 . . . K) in the first three-dimensional rectangular coordinates system, into a second coordinates ($x'_i$, $y'_i$, $z'_i$) and a second normal vectors ($\alpha'_i$, $\beta'_i$, $\gamma'_i$), of the Nth plurality of feature data points $P_i$ (i=1, 2 . . . K) in the second three-dimensional rectangular coordinates system;
step (S24): fitting the Nth plurality of feature data points $P_i$ (i=1, 2 . . . K) into a conic surface equation of a conic surface in the second three-dimensional rectangular coordinates system, based on the second coordinates (x'i, y'i, z'i) and the curvature c of the sphere, and obtaining a conic constant k; and
step (S25): removing a plurality of third coordinates and a plurality of third normal vectors of the Nth plurality of feature data points $P_i$ (i=1, 2 ... K), on the conic surface in the second three-dimensional rectangular coordinates system, from the second coordinates $(x'_i, y'_i, z'_i)$ and the second normal vectors $(\alpha'_i, \beta'_i, \gamma'_i)$, to obtain a plurality of residual coordinates $(x''_i, y''_i, z''_i)$ (i=1, 2, ..., K) and a plurality of residual normal vectors $N_i=(\alpha''_i, \beta''_i, -1)$ (i=1, 2, ..., K); and surface fitting the plurality of residual coordinates $(x''_i, y''_i, z''_i)$ (i=1, 2, ..., K) and the plurality of residual normal vectors $N_i=(\alpha''_i, \beta''_i, -1)$ (i=1, 2, ..., K) to obtain a polynomial surface equation; the Nth equation of the Nth freeform surface are obtained by adding the conic surface equation and the polynomial surface equation;

step (S3), keeping all the Nth freeform surface obtained in step (S2) and some of the plurality of initial surfaces that does not corresponds to the Nth freeform surface unchanged, and selecting N as N=N+1;

step (S4), repeating the step (S2) to step (S3) until all freeform surfaces of the off-axial optical system that need to be solved are obtained, and obtaining a before-iteration off-axial optical system; and step (S5), taking the before-iteration off-axial optical system obtained in step (S4) as a second initial system for an iteration process, and obtaining an after-iteration off-axial optical system with improved imaging quality by multiple iterations.

2. The method of claim 1, wherein the Nth plurality of feature data points $P_i$ (i=1, 2 ... K) is obtained by:

step (a): defining a first intersection of a first feature ray R1 and one of the plurality of initial surfaces that corresponds to the Nth freeform surface as a feature data point $P_1$;

step (b): when i ($1 \le i \le K-1$) feature data points $P_i$ ($1 \le i \le K-1$) have been obtained, a unit normal vector $\vec{N}_t$ ($1 \le i \le K-1$) at each of the i ($1 \le i \le K-1$) feature data points $P_i$ ($1 \le i \le K-1$) is calculated based on the vector form of Snell's Law;

step (c): making a first tangent plane at the i ($1 \le i \le K-1$) feature data points $P_i$ ($1 \le i \le K-1$) respectively; thus i first tangent planes are obtained, and i×(K−i) second intersections are obtained by the i first tangent planes intersecting with other (K−i) feature rays; and a second intersection, which is nearest to the i ($1 \le i \le K-1$) feature data points $P_i$, is fixed from the i×(K−i) second intersections as a next feature data point $P_{i+1}$ ($1 \le i \le K-1$); and step (d): repeating steps (b) and (c), until all the Nth plurality of feature data points $P_i$ (i=1, 2 ... K) are calculated.

3. The method of claim 1, wherein the Nth plurality of feature data points $P_i$ (i=1, 2 ... K) is obtained by:

step (a'): defining a first intersection of a first feature light ray $R_1$ and one of the plurality of initial surfaces that corresponds to the Nth freeform surface as a feature data point $P_1$;

step (b'): when an ith ($1 \le i \le K-1$) feature data point $P_i$ ($1 \le i \le K-1$) has been obtained, a unit normal vector $\vec{N}_t$ at the ith ($1 \le i \le K-1$) feature data point $P_i$ ($1 \le i \le K-1$) are calculated based on the vector form of Snell's law;

step (c'): making a first tangent plane through the ith ($1 \le i \le K-1$) feature data point $P_i$ ($1 \le i \le K-1$), and (K−i) second intersections are obtained by the first tangent plane intersecting with other (K−i) feature rays; a second intersection $Q_{i+1}$, which is nearest to the ith ($1 \le i \le K-1$) feature data point $P_i$ ($1 \le i \le K-1$), is fixed; and one of the plurality of feature rays $R_i$ (i=1, 2 ... K) corresponding to the second intersection $Q_{i+1}$ is defined as $R_{i+1}$, a shortest distance between the second intersection $Q_{i+1}$ and an ith feature data point $P_i$ ($1 \le i \le K-1$) is defined as $d_i$;

step (d'): making a second tangent plane at (i−1) first feature data points that are obtained before the ith feature data point $P_i$ ($1 \le i \le K-1$) respectively; thus, (i−1) second tangent planes are obtained, and (i−1) third intersections are obtained by the (i−1) second tangent planes intersecting with a feature ray $R_{i+1}$; in each of the (i−1) second tangent planes, each of the (i−1) third intersections and some of the plurality of feature data points $P_i$ (i=1, 2 ... K) that corresponds to the (i−1) third intersections form an intersection pair; the intersection pair, which has the shortest distance between one of the (i−1) third intersections and one of the plurality of feature data points $P_i$ (i=1, 2 ... K) that corresponds to the one of the (i−1) third intersections, is fixed; and the one of the (i−1) third intersections and the shortest distance is defined as $Q'_{i+1}$ and $d'_i$ respectively;

step (e'): comparing $d_i$ and $d'_i$, if $d_i \le d'_i$, $Q_{i+1}$ is taken as a next feature data point $P_{i+1}$ ($1 \le i \le K-1$); otherwise, $Q'_{i+1}$ is taken as the next feature data point $P_{i+1}$ ($1 \le i \le K-1$); and step (f'): repeating steps from (b') to (e'), until all the Nth plurality of feature data points $P_i$ (i=1, 2 ... K) are calculated.

4. The method of claim 1, wherein a relationship between the second coordinates $(x'_i, y'_i, z'_i)$ and the first coordinates $(x_i, y_i, z_i)$ satisfies the following equation:

$$\begin{cases} x'_i = x_i - x_o \\ y'_i = (y_i - y_o)\cos\theta - (z_i - z_o)\sin\theta \\ z'_i = (y_i - y_o)\sin\theta + (z_i - z_o)\cos\theta \end{cases};$$

wherein θ is a tilt angle of the sphere, in a Y'O'Z' plane of the second three-dimensional rectangular coordinates system relative to in a YOZ plane of the first three-dimensional rectangular coordinates system.

5. The method of claim 1, wherein a relationship between the second normal vectors $(\alpha'_i, \beta'_i, \gamma'_i)$ and the first normal vectors $(\alpha_i, \beta i, \gamma_i)$ satisfies the following equation:

$$\begin{cases} \alpha'_i = \alpha_i \\ \beta'_i = \beta_i \cos\theta - \gamma_i \sin\theta \\ \gamma'_i = \beta_i \sin\theta + \gamma_i \cos\theta \end{cases},$$

wherein θ is a tilt angle of the sphere, in a Y'O'Z' plane of the second three-dimensional rectangular coordinates system relative to in a YOZ plane of the first three-dimensional rectangular coordinates system.

6. The method of claim 1, wherein a method of surface fitting the plurality of residual coordinates $(x''_i, y''_i, z''_i)$ (i=1, 2, ..., K) and the plurality of residual normal vectors $N_i=(\alpha''_i, \beta''_i, -1)$ (i=1, 2, ..., K) comprises:

step (S251), expressing a polynomial surface by the polynomial surface equation, wherein the polynomial surface is expressed in terms of the following equation:

$$z = f(x, y; P) = \sum_{j=1}^{J} P_j g_j(x, y),$$

wherein $g_j(x, y)$ is one item of a polynomial, and $P=(p_1, p_2, \ldots, p_J)^T$ is coefficient sets;

step (S252), acquiring a first sum of squares $d_1(P)$, of residual coordinate differences in z direction between the plurality of residual coordinates $(x''_i, y''_i, z''_i)$ (i=1, 2, ..., K) and the Nth freeform surface; and a second sum of squares $d_2(P)$, of modulus of vector differences between the plurality of residual normal vectors $N_i = (\alpha''_i, \beta''_i, -1)$ (i=1, 2, ..., K) and a third normal vector of the Nth freeform surface, wherein the first sum of squares $d_1(P)$ is expressed in terms of a fourth equation:

$$d_1(P) = \sum_{i=1}^{I} [z_i - f(x''_i, y''_i; P)]^2 = (Z - A_1 P)^T (Z - A_1 P),$$

and the second sum of squares $d_2(P)$ is expressed in terms of a fifth equation:

$$d_2(P) = \sum_{i=1}^{I} \{[u_i - f_{x''}(x''_i, y''_i; P)]^2 + [v_i - f_{y''}(x''_i, y''_i; P)]^2\} =$$
$$(U - A_2 P)^T (U - A_2 P) + (V - A_3 P)^T (V - A_3 P)$$

wherein, $Z = (z_1, z_2, L, z_I)^T$, $U = (u_1, u_2, L, u_I)^T$, $V = (v_1, v_2, L, v_I)^T$, $$A_1 = \begin{pmatrix} g_1(x''_1, y''_1) & g_2(x''_1, y''_1) & \cdots & g_J(x''_1, y''_1) \\ g_1(x''_2, y''_2) & g_2(x''_2, y''_2) & \cdots & g_J(x''_2, y''_2) \\ \vdots & \vdots & & \vdots \\ g_1(x''_I, y''_I) & g_2(x''_I, y''_I) & \cdots & g_J(x''_I, y''_I) \end{pmatrix},$$

$$A_2 = \begin{pmatrix} g^x_1(x''_1, y''_1) & g^x_2(x''_1, y''_1) & \cdots & g^x_J(x''_1, y''_1) \\ g^x_1(x''_2, y''_2) & g^x_2(x''_2, y''_2) & \cdots & g^x_J(x''_2, y''_2) \\ \vdots & \vdots & & \vdots \\ g^x_1(x''_I, y''_I) & g^x_2(x''_I, y''_I) & \cdots & g^x_J(x''_I, y''_I) \end{pmatrix},$$

$$A_3 = \begin{pmatrix} g^y_1(x''_1, y''_1) & g^y_2(x''_1, y''_1) & \cdots & g^y_J(x''_1, y''_1) \\ g^y_1(x''_2, y''_2) & g^y_2(x''_2, y''_2) & \cdots & g^y_J(x''_2, y''_2) \\ \vdots & \vdots & & \vdots \\ g^y_1(x''_I, y''_I) & g^y_2(x''_I, y''_I) & \cdots & g^y_J(x''_I, y''_I) \end{pmatrix};$$

step (S253), obtaining an evaluation function, $$P = (A_1^T A_1 + w A_2^T A_2 + w A_3^T A_3)^{-1} \cdot (A_1^T Z + w A_2^T U + w A_3^T V),$$

wherein w is a weighting and greater than 0;

step (S254), selecting different weightings w and setting a gradient $\Box f(P)$ of the evaluation function equal to 0, to obtain a plurality of different values of P and a plurality of freeform surface shapes $z=f(x, y; P)$ corresponding to each of the plurality of different values of P; and step (S255), choosing a final freeform surface shape $\Omega_{opt}$ which has a best imaging quality from the plurality of freeform surface shapes $z=f(x, y; P)$.

7. The method of claim 6, wherein the Nth equation of the Nth freeform surface is:

$$z(x, y) = \frac{c(x^2 + y^2)}{1 + \sqrt{1 - (1+k)c^2(x^2 + y^2)}} + \sum_{j=1}^{N} A_j g_j(x, y);$$

wherein, $$\frac{c(x^2 + y^2)}{1 + \sqrt{1 - (1+k)c^2(x^2 + y^2)}}$$

is the Nth base conic term, c is the curvature of the conic surface at the vertex, k is the conic constant;

$$\sum_{j=1}^{N} A_j g_j(x, y)$$

is the Nth freeform surface term, $A_i$ represents an $i^{th}$ term coefficient.

8. The method of claim 1, wherein the multiple iterations comprises:

step (S51): a Nth plurality of actual intersections of the plurality of feature rays $R_i$ (i=1, 2 ... K) with the Nth freeform surface are solved according to the Nth equation and defined as a Nth plurality of actual feature data points $P'_i$ (i=1, 2, ..., K), a unit normal vector at each of the Nth plurality of actual feature data points $P'_i$ (i=1, 2, ..., K) is calculated, and the Nth plurality of actual feature data points $P'_i$ (i=1, 2, ..., K) are surface fitted with the method in step (S2), to obtain an after-iteration Nth freeform surface;

step (S52): selecting N as N=N+1;

step (S53): repeating the step (S52) to step (S53) until all Nth freeform surfaces obtained in step (S4) are solved and surface fitted again to obtain all after-iteration Nth freeform surfaces, thereby a first after-iteration off-axial optical system is obtained and the iteration process is performed once; and step (S54): the first after-iteration off-axial optical system obtained in step (S53) is used as a third initial system, and repeating step (S51) to step (S53), until the plurality of actual second intersections of the plurality of feature rays $R_i$ (i=1, 2 ... K) with a target surface are close to target points.

9. The method of claim 1, wherein the multiple iterations comprises:

step (S51'), repeating step (S2) to step (S4), thereby the after-iteration off-axial optical system is obtained and the iteration process is performed once;

step (S52'), the after-iteration off-axial optical system generated by step (S51') is taken as a third initial system, and repeating step (S51'), until the plurality of second actual intersections of the plurality of feature rays $R_i$ (i=1, 2 ... K) with a target surface are close to target points.

10. A method for designing three-dimensional freeform surface of an off-axial optical system comprising:

step (S1), establishing a first initial system, wherein the first initial system comprises a plurality of initial surfaces, and each of the plurality of initial surfaces corresponds to one freeform surface of the off-axial optical system;

step (S2), a Nth freeform surface of the off-axial optical system that need to be solved is selected, wherein N=1, keeping the plurality of initial surfaces unchanged, selecting a plurality of feature rays $R_i$ (i=1, 2 . . . K), calculating a Nth plurality of intersections of the plurality of feature rays $R_i$ (i=1, 2 . . . K) with the Nth freeform surface point by point based on a given object-image relationship and a vector form of Snell's law, wherein the Nth plurality of intersections are a Nth plurality of feature data points $P_i$ (i=1, 2 . . . K) of the Nth freeform surface; and obtaining a Nth equation of the Nth freeform surface by surface fitting the Nth plurality of feature data points $P_i$ (i=1, 2 . . . K), wherein the Nth equation of the Nth freeform surface comprises a Nth base conic term and a Nth freeform surface term; wherein the surface fitting the Nth plurality of feature data points $P_i$ (i=1, 2 . . . K) comprises:

step (21): surface fitting the Nth plurality of feature data points $P_i$ (i=1, 2 . . . K) to a sphere in a first three-dimensional rectangular coordinates system, and obtaining a curvature c of the sphere and a center of curvature $(x_c, y_c, z_c)$ corresponding to the curvature c of the sphere;

step (S22): defining a feature data point $(x_o, y_o, z_o)$ corresponding to a chief ray of a central field angle among entire field-of-view as a vertex of the sphere, defining a second three-dimensional rectangular coordinates system by the vertex of the sphere as origin and a line passing through the center of curvature and the vertex of the sphere as a Z'-axis;

step (S23): transforming a first coordinates $(x_i, y_i, z_i)$ and a first normal vectors $(\alpha i, \beta i, \gamma_i)$, of the Nth plurality of feature data points $P_i$ (i=1, 2 . . . K) in the first three-dimensional rectangular coordinates system, into a second coordinates (x'i, y'i, z'i) and a second normal vectors ($\alpha$'i, $\beta$'i, $\gamma$'i), of the Nth plurality of feature data points $P_i$ (i=1, 2 . . . K) in the second three-dimensional rectangular coordinates system; wherein a relationship between the second coordinates (x'i, y'$_i$, z'$_i$) and the first coordinates ($x_i$, $y_i$, $z_i$) satisfies the following equation:

$$\begin{cases} x'_i = x_i - x_o \\ y'_i = (y_i - y_o)\cos\theta - (z_i - z_o)\sin\theta \\ z'_i = (y_i - y_o)\sin\theta + (z_i - z_o)\cos\theta \end{cases}$$

wherein $\theta$ is a tilt angle of the sphere, in a Y'O'Z' plane of the second three-dimensional rectangular coordinates system relative to in a YOZ plane of the first three-dimensional rectangular coordinates system;

step (S24): fitting the Nth plurality of feature data points $P_i$ (i=1, 2 . . . K) into a conic surface equation of a conic surface in the second three-dimensional rectangular coordinates system, based on the second coordinates (x'i, y'i, z'i) and the curvature c of the sphere, and obtaining a conic constant k; and step (S25): removing a plurality of third coordinates and a plurality of third normal vectors of the Nth plurality of feature data points $P_i$ (i=1, 2 . . . K), on the conic surface in the second three-dimensional rectangular coordinates system, from the second coordinates (x'i, y'i, z'i) and the second normal vectors (a'i, $\beta$'i, $\gamma$'i), to obtain a plurality of residual coordinates (x"$_i$, y"$_i$, z"$_i$) (i=1, 2, . . . , K) and a plurality of residual normal vectors $N_i = (a"_i, \beta"_i, -1)$ (i=1, 2, . . . , K); and surface fitting the plurality of residual coordinates (x"$_i$, y"$_i$, z"$_i$) (i=1, 2, . . . , K) and the plurality of residual normal vectors $N_i = (\alpha"_i, \beta"_i, -1)$ (i=1, 2, . . . , K) to obtain a polynomial surface equation; the Nth equation of the Nth freeform surface are obtained by adding the conic surface equation and the polynomial surface equation;

step (S3), keeping all the Nth freeform surface obtained in step (S2) and some of the plurality of initial surfaces that does not corresponds to the Nth freeform surface unchanged, and selecting N as N=N+1;

step (S4), repeating the step (S2) to step (S3) until all freeform surfaces of the off-axial optical system that need to be solved are obtained, and obtaining a before-iteration off-axial optical system; and step (S5), taking the before-iteration off-axial optical system obtained in step (S4) as a second initial system for an iteration process, and obtaining an after-iteration off-axial optical system with improved imaging quality by multiple iterations.

11. A method for designing three-dimensional freeform surface of an off-axial optical system comprising:

step (S1), establishing a first initial system, wherein the first initial system comprises a plurality of initial surfaces, and each of the plurality of initial surfaces corresponds to one freeform surface of the off-axial optical system;

step (S2), a Nth freeform surface of the off-axial optical system that need to be solved is selected, wherein N=1, keeping the plurality of initial surfaces unchanged, selecting a plurality of feature rays $R_i$ (i=1, 2 . . . K), calculating a Nth plurality of intersections of the plurality of feature rays $R_i$ (i=1, 2 . . . K) with the Nth freeform surface point by point based on a given object-image relationship and a vector form of Snell's law, wherein the Nth plurality of intersections are a Nth plurality of feature data points $P_i$ (i=1, 2 . . . K) of the Nth freeform surface; and obtaining a Nth equation of the Nth freeform surface by surface fitting the Nth plurality of feature data points $P_i$ (i=1, 2 . . . K), wherein the Nth equation of the Nth freeform surface comprises a Nth base conic term and a Nth freeform surface term; wherein the surface fitting the Nth plurality of feature data points $P_i$ (i=1, 2 . . . K) comprises:

step (21): surface fitting the Nth plurality of feature data points $P_i$ (i=1, 2 . . . K) to a sphere in a first three-dimensional rectangular coordinates system, and obtaining a curvature c of the sphere and a center of curvature $(x_c, y_c, z_c)$ corresponding to the curvature c of the sphere;

step (S22): defining a feature data point $(x_o, y_o, z_o)$ corresponding to a chief ray of a central field angle among entire field-of-view as a vertex of the sphere, defining a second three-dimensional rectangular coordinates system by the vertex of the sphere as origin and a line passing through the center of curvature and the vertex of the sphere as a Z'-axis;

step (S23): transforming a first coordinates $(x_i, y_i, z_i)$ and a first normal vectors $\alpha_i$, $\beta_i$, $\gamma_i$), of the Nth plurality of feature data points $P_i$ (i=1, 2 . . . K) in the first three-dimensional rectangular coordinates system, into a second coordinates (x'i, y'i, z'i) and a second normal vectors ($\alpha'_i$, $\beta'_i$, $\gamma'_i$), of the Nth plurality of feature data points $P_i$ (i=1, 2 ... K) in the second three-dimensional rectangular coordinates system; wherein a relationship between the second normal vectors ($\alpha'_i$, $\beta'_i$, $\gamma'_i$) and the first normal vectors ($\alpha_i$, $\beta_i$, $\gamma_i$) satisfies the following equation:

$$\begin{cases} \alpha'_i = \alpha_i \\ \beta'_i = \beta_i \cos\theta - \gamma_i \sin\theta \\ \gamma'_i = \beta_i \sin\theta + \gamma_i \cos\theta \end{cases},$$

wherein θ is a tilt angle of the sphere, in a Y'O'Z' plane of the second three-dimensional rectangular coordinates system relative to in a YOZ plane of the first three-dimensional rectangular coordinates system;

step (S24): fitting the Nth plurality of feature data points $P_i$ (i=1, 2 ... K) into a conic surface equation of a conic surface in the second three-dimensional rectangular coordinates system, based on the second coordinates ($x'_i$, $y'_i$, $z'_i$) and the curvature c of the sphere, and obtaining a conic constant k; and step (S25): removing a plurality of third coordinates and a plurality of third normal vectors of the Nth plurality of feature data points $P_i$ (i=1, 2 ... K), on the conic surface in the second three-dimensional rectangular coordinates system, from the second coordinates ($x'_i$, $y'_i$, $z'_i$) and the second normal vectors ($\alpha'_i$, $\beta'_i$, $\gamma'_i$), to obtain a plurality of residual coordinates ($x''_i$, $y''_i$, $z''_i$) (i=1, 2, ..., K) and a plurality of residual normal vectors $N_i=(\alpha''_i, \beta''_i, -1)$ (i=1, 2, ..., K); and surface fitting the plurality of residual coordinates ($x''_i$, $y''_i$, $z''_i$) (i=1, 2, ..., K) and the plurality of residual normal vectors $N_i=(a''_i, \beta''_i, -1)$ (i=1, 2, ..., K) to obtain a polynomial surface equation; the Nth equation of the Nth freeform surface are obtained by adding the conic surface equation and the polynomial surface equation;

step (S3), keeping all the Nth freeform surface obtained in step (S2) and some of the plurality of initial surfaces that does not corresponds to the Nth freeform surface unchanged, and selecting N as N=N+1;

step (S4), repeating the step (S2) to step (S3) until all freeform surfaces of the off-axial optical system that need to be solved are obtained, and obtaining a before-iteration off-axial optical system; and step (S5), taking the before-iteration off-axial optical system obtained in step (S4) as a second initial system for an iteration process, and obtaining an after-iteration off-axial optical system with improved imaging quality by multiple iterations.

\* \* \* \* \*